United States Patent
Weers

(10) Patent No.: US 11,254,881 B2
(45) Date of Patent: Feb. 22, 2022

(54) METHODS OF USING IONIC LIQUIDS AS DEMULSIFIERS

(71) Applicant: Baker Hughes Holdings LLC, Houston, TX (US)

(72) Inventor: Jerry Weers, Richmond, TX (US)

(73) Assignee: Baker Hughes Holdings LLC, Houston, TX (US)

(*) Notice: Subject to any disclaimer, the term of this patent is extended or adjusted under 35 U.S.C. 154(b) by 34 days.

(21) Appl. No.: 16/509,302

(22) Filed: Jul. 11, 2019

(65) Prior Publication Data

US 2020/0017776 A1 Jan. 16, 2020

Related U.S. Application Data

(60) Provisional application No. 62/696,544, filed on Jul. 11, 2018.

(51) Int. Cl.
| | | |
|---|---|---|
| *C10G 33/04* | (2006.01) | |
| *B01D 17/04* | (2006.01) | |
| *C09K 15/20* | (2006.01) | |
| *C09K 15/26* | (2006.01) | |
| *C09K 15/30* | (2006.01) | |
| *C23F 11/14* | (2006.01) | |
| *C10L 1/236* | (2006.01) | |
| *C10L 10/04* | (2006.01) | |
| *C10L 10/16* | (2006.01) | |

(52) U.S. Cl.
CPC ........... *C10G 33/04* (2013.01); *B01D 17/047* (2013.01); *C09K 15/20* (2013.01); *C09K 15/26* (2013.01); *C09K 15/30* (2013.01); *C10L 1/236* (2013.01); *C10L 10/04* (2013.01); *C10L 10/16* (2013.01); *C23F 11/149* (2013.01); *C10G 2300/1037* (2013.01); *C10G 2300/1055* (2013.01); *C10G 2300/1059* (2013.01); *C10G 2300/304* (2013.01); *C10G 2300/80* (2013.01); *C10G 2400/04* (2013.01); *C10L 2200/0438* (2013.01); *C10L 2200/0446* (2013.01); *C10L 2270/026* (2013.01)

(58) Field of Classification Search
CPC .................. C10G 33/00–04; B01D 17/047
See application file for complete search history.

(56) References Cited

U.S. PATENT DOCUMENTS

| | | |
|---|---|---|
| 4,892,944 A | 1/1990 | Mori et al. |
| 5,143,594 A | 9/1992 | Stephenson et al. |
| 5,354,453 A | 10/1994 | Bhatia |
| 5,840,177 A | 11/1998 | Weers et al. |
| 5,998,530 A | 12/1999 | Krull et al. |
| 6,013,145 A | 1/2000 | Amo et al. |
| 6,013,175 A | 1/2000 | Weers et al. |
| 6,180,683 B1 | 1/2001 | Miller et al. |
| 6,313,367 B1 | 11/2001 | Breen et al. |
| 6,852,229 B2 | 2/2005 | Mehnert et al. |
| 7,001,504 B2 | 2/2006 | Schoonover |
| 7,432,409 B2 | 10/2008 | Elomari et al. |
| 7,459,011 B2 | 12/2008 | Cadours et al. |
| 7,470,829 B2 | 12/2008 | Cadours et al. |
| 7,605,297 B2 | 10/2009 | Maase et al. |
| 7,786,065 B2 | 8/2010 | Hecht et al. |
| 7,880,024 B2 | 2/2011 | Um et al. |
| 7,918,905 B2 | 4/2011 | Kremer et al. |
| 8,075,763 B2 | 12/2011 | Sneedon et al. |
| 8,084,402 B2 | 12/2011 | Berry et al. |
| 8,115,040 B2 | 2/2012 | Elomari et al. |
| 8,123,930 B2 | 2/2012 | Cohrs et al. |
| 8,168,830 B2 | 5/2012 | Armstrong et al. |
| 8,461,382 B2 | 6/2013 | Kunz et al. |
| 8,609,572 B2 | 12/2013 | Earl et al. |
| 8,652,237 B2 | 2/2014 | Heldebrant et al. |
| 8,679,203 B2 | 2/2014 | O'Brien et al. |
| 8,758,600 B2 | 6/2014 | Koseoglu. et al. |
| 8,821,716 B2 | 9/2014 | Victorovna Likhanova et al. |
| 8,858,803 B2 | 10/2014 | Guliashvili et al. |
| 8,888,993 B2 | 11/2014 | Verma et al. |
| 8,915,990 B2 | 12/2014 | Betting et al. |
| 8,916,734 B2 | 12/2014 | Tang et al. |
| 8,992,767 B2 | 3/2015 | Koseoglu. et al. |
| 9,157,034 B2 | 10/2015 | Martinez Palou et al. |
| 9,249,261 B2 | 2/2016 | Anderson |
| 9,267,082 B2 | 2/2016 | Braden et al. |
| 9,328,295 B2 | 5/2016 | Gattupalli et al. |
| 9,360,425 B2 | 6/2016 | Jennings et al. |
| 9,394,617 B2 | 7/2016 | Hall et al. |
| 9,404,052 B2 | 8/2016 | Flores Oropeza et al. |
| 9,447,335 B2 | 9/2016 | Abai et al. |
| 9,453,830 B2 | 9/2016 | Zhang et al. |

(Continued)

FOREIGN PATENT DOCUMENTS

| | | |
|---|---|---|
| CN | 1629257 A | 6/2005 |
| CN | 107177353 A | 9/2017 |

(Continued)

OTHER PUBLICATIONS

Amaraskekara, A. S., "Acidic Ionic Liquids", Chemical Reviews, American Chemical Society Publications, 2016 (50 pages).

Balsamo, M, et al., "Chemical Demulsification of Model Water-in-oil Emulsions with Low Water Content by Means of Ionic Liquids," Brazilian Journal of Chemical Engineering, vol. 34, No. 1, pp. 273-282, 2017 (10 pages).

Falkler, T., et al., "Fine-tune processing heavy crudes in your facility," Hydrocarbon Processing, Refining Developments, Sep. 2010 (6 pages).

Flores, Cesar A., et al., "Anion and cation effects of ionic liquids and ammonium salts evaluated as dehydrating agents for super-heavy crude oil: Experimental and theoretical points of view," Elsevier, Journal of Molecular Liquids 2014 (9 pages).

Ghandi, K., "A Review of Ionic Liquids, Their Limits and Applications," Green and Sustainable Chemistry, 2014, Jan. 4, 2014, (10 pages).

(Continued)

*Primary Examiner* — Renee Robinson
(74) *Attorney, Agent, or Firm* — John Wilson Jones; Jones Delflache LLP

(57) ABSTRACT

A method of demulsifying an emulsion with an ionic liquid having a nitrogen or phosphorus cation.

25 Claims, No Drawings

(56) References Cited

U.S. PATENT DOCUMENTS

| | | | |
|---|---|---|---|
| 9,464,239 B2 | 10/2016 | Nares Ochoa et al. | |
| 9,574,139 B2 | 2/2017 | Broderick et al. | |
| 9,587,182 B2 | 3/2017 | Flores Oropeza et al. | |
| 9,593,015 B2 | 3/2017 | Ballaguet et al. | |
| 9,611,209 B1 | 4/2017 | Liu et al. | |
| 9,611,434 B2 | 4/2017 | Morgan et al. | |
| 9,624,758 B2 | 4/2017 | Hardy et al. | |
| 9,637,676 B2 | 5/2017 | Leonard et al. | |
| 9,637,689 B2 | 5/2017 | Al-Hajji et al. | |
| 9,663,726 B2 | 5/2017 | Yang et al. | |
| 9,765,044 B2 | 9/2017 | Socha et al. | |
| 9,803,450 B2 | 10/2017 | Hardy et al. | |
| 9,850,197 B2 | 12/2017 | Martinez Palou et al. | |
| 9,856,422 B2 | 1/2018 | Hardacre et al. | |
| 9,926,775 B2 | 3/2018 | O'Rear et al. | |
| 10,000,641 B2 | 6/2018 | Miles et al. | |
| 10,093,868 B1 | 10/2018 | Weers et al. | |
| 10,174,429 B2 | 1/2019 | Kalakodimi et al. | |
| 10,174,439 B2 | 1/2019 | Kalakodimi et al. | |
| 10,179,879 B2 | 1/2019 | O'Rear et al. | |
| 10,246,629 B2 | 4/2019 | Gill | |
| 10,301,553 B2 | 5/2019 | Geissler et al. | |
| 10,858,604 B2 | 12/2020 | Ngyuen et al. | |
| 2002/0055438 A1* | 5/2002 | Giard-Blanchard | B01D 17/047 507/100 |
| 2003/0085156 A1 | 5/2003 | Schoonover | |
| 2003/0204041 A1 | 10/2003 | Laas et al. | |
| 2004/0044264 A1 | 3/2004 | Smith | |
| 2004/0188350 A1 | 9/2004 | Beste et al. | |
| 2005/0005840 A1 | 1/2005 | Bonrath | |
| 2005/0010076 A1 | 1/2005 | Wasserscheid et al. | |
| 2005/0241997 A1 | 11/2005 | Kremer et al. | |
| 2006/0054538 A1 | 3/2006 | Hsu et al. | |
| 2006/0070917 A1 | 4/2006 | McCarthy et al. | |
| 2006/0223995 A1 | 10/2006 | Uchimura et al. | |
| 2007/0062698 A1 | 3/2007 | Smith et al. | |
| 2007/0123446 A1 | 5/2007 | Kenneally et al. | |
| 2007/0142211 A1 | 6/2007 | Elomari et al. | |
| 2007/0142642 A1 | 6/2007 | Szarvas et al. | |
| 2007/0221539 A1 | 9/2007 | Cohrs et al. | |
| 2008/0114105 A1 | 5/2008 | Hell et al. | |
| 2008/0251759 A1 | 10/2008 | Kalb et al. | |
| 2009/0090655 A1 | 4/2009 | Stark et al. | |
| 2009/0291872 A1 | 11/2009 | Bara et al. | |
| 2009/0320771 A1 | 12/2009 | Torres, Jr. et al. | |
| 2010/0093577 A1 | 4/2010 | Ritchie et al. | |
| 2010/0147022 A1 | 6/2010 | Hart et al. | |
| 2010/0217010 A1 | 8/2010 | Massonne et al. | |
| 2010/0270211 A1 | 10/2010 | Wolny | |
| 2010/0297532 A1 | 11/2010 | Beste et al. | |
| 2011/0172473 A1 | 7/2011 | Nguyen et al. | |
| 2011/0186515 A1 | 8/2011 | Lourenco-Guimaraes et al. | |
| 2012/0024751 A1 | 2/2012 | He et al. | |
| 2012/0031810 A1 | 2/2012 | Stark et al. | |
| 2012/0053101 A1 | 3/2012 | Yang et al. | |
| 2012/0186993 A1 | 7/2012 | Huang et al. | |
| 2012/0238764 A1 | 9/2012 | Klein et al. | |
| 2012/0255886 A1* | 10/2012 | Flores Oropeza | C10G 33/04 208/188 |
| 2012/0261312 A1* | 10/2012 | Flores Oropeza | C08G 65/2621 208/188 |
| 2012/0321967 A1 | 12/2012 | Wolfe et al. | |
| 2013/0041159 A1 | 2/2013 | Siemer et al. | |
| 2013/0101460 A1 | 4/2013 | Ramachandran et al. | |
| 2013/0209324 A1 | 8/2013 | Timken et al. | |
| 2013/0261227 A1* | 10/2013 | Nguyen | C10G 31/08 523/403 |
| 2013/0288886 A1 | 10/2013 | Aduri et al. | |
| 2014/0007768 A1 | 1/2014 | van den Broeke et al. | |
| 2014/0045732 A1 | 2/2014 | Mazyar et al. | |
| 2014/0158928 A1 | 6/2014 | Zhou et al. | |
| 2014/0170041 A1 | 6/2014 | Harrison et al. | |
| 2014/0299543 A1 | 10/2014 | Zhou et al. | |
| 2014/0350299 A1 | 11/2014 | Huo et al. | |
| 2014/0378718 A1 | 12/2014 | Gu et al. | |
| 2015/0047849 A1 | 2/2015 | Wicker, Jr. et al. | |
| 2015/0093313 A1 | 4/2015 | Broderick et al. | |
| 2015/0111799 A1 | 4/2015 | Miranda Olvera et al. | |
| 2015/0231529 A1 | 8/2015 | Akolekar et al. | |
| 2016/0001218 A1 | 1/2016 | Rota | |
| 2016/0032161 A1 | 2/2016 | Campbell et al. | |
| 2016/0075952 A1 | 3/2016 | Kim et al. | |
| 2016/0146734 A1 | 5/2016 | Felipe et al. | |
| 2016/0175737 A1 | 6/2016 | Hembre et al. | |
| 2016/0177691 A1 | 6/2016 | Benson et al. | |
| 2016/0185732 A1 | 6/2016 | Pommersheim | |
| 2016/0230101 A1 | 8/2016 | Nguyen et al. | |
| 2016/0326432 A1 | 11/2016 | Felipe et al. | |
| 2016/0367976 A1 | 12/2016 | Uppara et al. | |
| 2017/0077557 A1 | 3/2017 | Zheng et al. | |
| 2017/0096606 A1 | 4/2017 | Pinappu et al. | |
| 2017/0101375 A1 | 4/2017 | Poshusta et al. | |
| 2017/0107162 A1 | 4/2017 | Duggal et al. | |
| 2017/0114001 A1 | 4/2017 | Atkins et al. | |
| 2017/0222266 A1 | 8/2017 | Zheng et al. | |
| 2017/0343526 A1 | 11/2017 | Cooks et al. | |
| 2019/0048712 A1 | 2/2019 | Jennings et al. | |
| 2019/0127639 A1 | 5/2019 | Moloney et al. | |
| 2019/0127640 A1 | 5/2019 | Moloney et al. | |
| 2019/0177599 A1 | 6/2019 | Weers | |
| 2019/0177622 A1 | 6/2019 | Weers | |
| 2020/0017766 A1 | 1/2020 | Weers | |
| 2020/0017776 A1 | 1/2020 | Weers | |
| 2020/0017790 A1 | 1/2020 | Weers | |

FOREIGN PATENT DOCUMENTS

| | | |
|---|---|---|
| CN | 108148565 A | 6/2018 |
| GB | 2304729 A | 8/1996 |
| GB | 2564735 A | 1/2019 |
| WO | 02/34863 A1 | 5/2002 |
| WO | 03/051894 A1 | 6/2003 |
| WO | 2003051894 A1 | 6/2003 |
| WO | 2007/138307 A2 | 12/2007 |
| WO | 2008052860 A1 | 5/2008 |
| WO | 2009040242 A1 | 4/2009 |
| WO | 2012123336 A1 | 9/2012 |
| WO | 2013096217 A1 | 6/2013 |
| WO | 2013096218 A1 | 6/2013 |
| WO | 2013171060 A1 | 11/2013 |
| WO | 2016189333 A1 | 5/2015 |
| WO | 2016189333 A1 | 12/2016 |
| WO | 2017105476 A1 | 6/2017 |
| WO | 2017136728 A1 | 8/2017 |
| WO | 2020014510 A1 | 1/2020 |
| WO | 2020014529 A1 | 1/2020 |
| WO | 2020014534 A1 | 1/2020 |
| WO | 2020036698 A2 | 2/2020 |

OTHER PUBLICATIONS

Hazrati, N., et al., Demulsification of water in crude oil emulsion using long chain imidazolium ionic liquids and optimization of parameters, Elsevier, Fuel 229, 126-134, 2018 (9 pages).

Brahim, M.H., "The role of ionic liquids in desulfurization of fuels: a review", Elsevier, Renewable and Sustainable Energy Reviews, 2017, 1534-1549 (16 pages).

Jennings, D.W., "MS New Dead-Crude Oil Asphaltene Inhibitor Test Method," OTC-25113-MS, 2014 (14 pages).

Papaiconomou, N., et al., "Selective Extraction of Copper, Mercury, Silver, and Palladium Ions from Water Using Hydrophobic Ionic Liquids," Ind. Eng. Chem Res, 2008, 47, 5080-5086 (7 pages).

Shah, S., N., "Extraction of Naphthenic Acid from Highly Acidic Oil Using Hydroxide-Based Ionic Liquids," ACS Publications 2014, 106-111 (6 pages).

Sulemana, N.T., et al., "Application of Ionic Liquids in the Upstream oil Industry—A Review", International Journal of Petrochemistry and Research, vol. 1, Issue 1, 2017, 50-60 (10 pages).

(56) References Cited

OTHER PUBLICATIONS

Velusamy, S., et al., "Substantial Enhancement of Heavy Crude Oil Dissolution in Low Waxy Crude Oil in the Presence of Ionic Liquid," Industrial & Engineering Chemistry Research, 2015, 7999-8009 (11 pages).
"Hydrogen Sulfide and Mercaptan Sulfur in Liquid Hydrocarbons," UOP Method 163-89, 1989 (7 pages).
Standard Test Method for Acid Number of Petroleum Products by Potentiometric Titration, ASTM, D-664-07, Designation 177/96, 2007 (8 pages).
Anderson, K., et al., "Naphthenic acid extraction and speciation from Doba crude oil using carbonate-based ionic liquids," Fuel, 146 (2015) 60-68.
Biniaz, P., et al., "Demulsification of water in oil emulsion using ionic liquids: Statistical modeling and optimization," Fuel 184 (2016) 325-333.
Boukherissa, M., et al., "Ionic Liquids as Dispersants of Petroleum Asphaltenes," Energy & Fuels (2009), 23, 2557-2564.
Hallett, J.P., et al., Room-Temperature Ionic Liquids: Solvents for Synthesis and Catalysis. 2, Amer. Chem. Soc. Publications, Chemical Reviews (2011) pp. 3508-3576.
Hu, Y, et al., "Effect of the Structures of Ionic Liquids and Alkylbenzene-Derived Amphiphiles on the Inhibition of Asphaltene Precipitation from Co2-Injected Reservoir Oils," Amer. Chem. Soc. Publications, (2005) 8168-8174.
Nezhad, E.R., et al., "Dispersing of Petroleum Asphaltenes by Acidic Ionic Liquid and Determination by UV-Visible Spectroscopy," Journal of Petroleum Engineering, vol. 2013, Article ID 203036, pp. 1-5 (2013).
Pereira, J.C., et al., "Resins: The Molecules Responsible for the Stability/Instability Phenomena of Asphaltenes," Energy & Fuels (2007), 21, 1317-1321.
Sakthivel, S., et al., Experimental Investigation on the Effect of Aliphatic Ionic Liquids on the Solubility of Heavy Crude Oil Using UV-Visible, Fourier Transform-Infrared, and 13C NMR Spectroscopy, (2014), Amer. Chem. Soc. Publications, pp. 6151-6162.
Shaban, S., et al., "Upgrading and Viscosity Reduction of Heavy Oil by Catalytic Ionic Liquid," (2014) Amer. Chem. Soc., pp. 6545-6553.
Subramanian, D., et al., "Ionic liquids as viscosity modifiers for heavy and extra-heavy crude oils," Fuel 143 (2015), 519-526.
Atta, A.M., et al. Application of new amphiphilic IL based on ethoxylated octadecylammonium tosylate demulsifier and crude oil spill dispersant, J. Industrial Engineering Chem., vol. 33, p. 122 (2016).
Yang, D., et al., "Comparison of the corrosion inh properties of imidazole based ionic liquids on API X52 steel in carbon dioxide saturated NaCL solution," Corrosion 2014, SPE Paper 4357.
Sakthivel, S., et al., "Nature Friendly Application of Ionic Liquids for Dissolution Enhancement of Heavy Crude Oil", SPE Paper 178418-MS (2015), Society of Petroleum Engineers.
Sakthivel, S., "Eco-Efficient Method for the Dissolution Enhancement of Heavy Crude Oil Using Ionic Liquids", SPE Paper 175160-MS (2015) Society of Petroleum Engineers.

\* cited by examiner

METHODS OF USING IONIC LIQUIDS AS DEMULSIFIERS

This application claims the benefit of U.S. application Ser. No. 62/696,544, filed on Jul. 11, 2018 which is herein incorporated by reference.

SPECIFICATION

Field of the Disclosure

The disclosure relates to the use of ionic liquids as demulsifiers.

Background of the Disclosure

When produced from wells, crude oil is emulsified with water. While oil and water are immiscible, naturally occurring surfactants are present in crude oil which cause the oil and water to aggregate at the oil water interface. This causes water to form droplets within the oil phase.

During transport of the crude to storage tanks through pipelines the two phases are increasingly mixed. Emulsions of water in oil, oil in water, water in oil in water and oil in water in oil develop. The oil external, water internal two-phase system is commonly referred to as a crude oil emulsion. These emulsions can become very stable due to the presence of emulsifying compounds (such as asphaltenes, carboxylic acids, resins and clays) present in the crude.

The presence of water in crude oil interferes with refining operations by inducing corrosion, increasing heat capacity and reducing the handling capacity of pipelines and refining equipment. This significantly increases operating costs, creates difficulties in transportation and damages the equipment due to corrosion and fouling. Crude oil thus must be treated to be practically free of water. The amount of water in crude oil routed to refinery distillation equipment is typically required to have less than 0.5 percent water.

Water in oil emulsions further contain salts, such as carbonates and sulfates of sodium, magnesium and calcium. These salts are detrimental to crude oil refining processes due to potential corrosion and foulant deposition in the refinery. If not removed, they can cause serious problems in subsequent refining processes. Desalting techniques include mixing of the incoming crude oil with water to extract the water soluble salts and hydrophilic solids therefrom. Refineries employ electrostatic desalters to separate crude oil from the wash water. Often these techniques are inadequate and demulsifiers are required.

Emulsions are typically broken or resolved by the addition of demulsifers. Demulsifiers alter the rheological properties of the interfacial layer and destabilize the oil endogenous emulsifier layer, thereby promoting rapid separation of water from oil. Demulsifiers promote coalescence of water droplets into larger droplets. These droplets then flocculate and the two phases then separate.

Commonly used demulsifiers include alkylphenol formaldehyde resin alkoxylates (AFRA), polyalkylene glycols (PAG), organic sulfonates, sulfonated glycerides, sulfonated oils, acetylated castor oils, ethylene and propylene oxide copolymers, alkoxylated amines and alkoxylated epoxy resins.

Commercially available demulsifiers often do not efficiently separate water and oil. Accordingly, there is an ongoing need for more effective demulsifiers.

SUMMARY OF THE DISCLOSURE

In an embodiment, the disclosure relates to the use of electronically neutral ionic liquids as a demulsifier; the ionic liquid being of formula (I):

$$A^+X^- \quad (I)$$

wherein A is or contains nitrogen, a nitrogen containing heterocyclic ring, is or contains phosphorus, or a phosphorus containing heterocycle; and X is an anion selected from the group consisting of halides; hydroxyl; carbonates; alkyl carbonates; bicarbonates; dithiocarbonates; trithiocarbonates; xanthates, thiocyanates; alkoxides; carboxylates; hydroxycarboxylates; amino fatty acids; anionic alkoxylated fatty acids; anionic metallic complexes, sulfur or silicon containing anions; anionic phosphate esters, anionic thiophosphate esters; anionic phosphonate esters; anionic thiophosphonate esters; alkyl substituted phosphines; anionic urea; anionic thiourea; anionic natural products; anionic thiols; anionic phenols; anionic phenol resins; anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacrylates and acrylamides, optionally copolymerized with one or more ethylenically unsaturated monomers; anionic phosphated maleic copolymers; an anionic homo or copolymer of an oxirane or methyloxirane; and mixtures thereof or a zwitterion.

Another embodiment relates to the use of ionic liquids as a demulsifier being of formula (II) or (III):

$$R^1R^2R^3R^4A^+X^- \quad (II); \text{ or}$$

$$R^1R^2R^3A^+R^8A^+R^5R^6R^7X^- \quad (III)$$

wherein:

A in formula (II) is or contains nitrogen or phosphorus or a heterocyclic ring thereof and wherein each A in formula (III) is independently selected from nitrogen or phosphorus or a heterocyclic ring thereof; and X is an anion selected from the group consisting of halides; hydroxyl; carbonates; alkyl carbonates; bicarbonates; carboxylates; hydroxycarboxylates; sulfonates; sulfates; bisulfites; thiocyanates; dithiocarbonates; dithiocarbonates; trithiocarbonates; carbamates; dithiocarbamates; xanthates; sulfides; polysulfides; alkoxides; anionic urea; anionic alkyl substituted phosphines; anionic amino fatty acids; anionic alkoxylated fatty acids; anionic acrylamido-methyl propane sulfonate/acrylic acid copolymers; anionic phosphated maleic copolymers; anionic metal complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof; anionic alkyl substituted phosphines; and anionic homopolymers, copolymers and terpolymers of one or more acrylates, methacrylates acrylamides and acids, optionally copolymerized with one or more ethylenically unsaturated monomers; anionic copolymers of olefins and vinyl acetate; anionic homo and copolymers of oxirane and/or methyloxirane; and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl (including —$CH_2CH_2OH$) or —$CH_2CH(CH_3)OH$; an oxirane or methyloxirane homo or copolymer containing ($CH_2CH_2O)_x$ $CH_2CH(CH_3)O)_y$ where x and y are independently selected from 1 to 1500 and mixtures thereof; a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring.

In another embodiment, a method of enhancing the performance of a (second) demulsifier as defined herein, by contacting the second demulsifier with an ionic liquid. In these instances, the ionic liquid may act as a promoter for the second demulsifier, the second demulsifier not being an ionic liquid.

Another embodiment of the disclosure relates to a method of treating a hydrocarbon fluid by contacting the hydrocarbon fluid with one or more of the ionic liquids of formula (I), (II) or (III).

Another embodiment of the disclosure is drawn to a method of enhancing the productivity of a hydrocarbon fluid from a subterranean formation penetrated by a well by introducing into the well any of the ionic liquids of formula (I), (II) or (III).

DETAILED DESCRIPTION OF THE PREFERRED EMBODIMENTS

The description provides specific details, such as material types, compositions, and processing conditions in order to provide a thorough description of embodiments of the disclosure. Characteristics and advantages of this disclosure and additional features and benefits will be readily apparent to those skilled in the art upon consideration of the following detailed description of exemplary embodiments. The description herein, being of exemplary embodiments, is not intended to limit the scope of the claims.

As used herein and throughout various portions (and headings) of this patent application, the terms "disclosure", "present disclosure" and variations thereof are not intended to mean every possible embodiment encompassed by this disclosure or any particular embodiment(s). Thus, the subject matter of each such reference should not be considered as necessary for, or part of, every embodiment hereof or of any particular embodiment(s) merely because of such reference.

Certain terms are used herein and in the appended embodiments to refer to particular components. As one skilled in the art will appreciate, different persons may refer to a component by different names. This document does not intend to distinguish between components that differ in name but not function. Also, the terms "including" and "comprising" are used herein and in the appended embodiments in an open-ended fashion, and thus should be interpreted to mean "including, but not limited to . . . ." Further, reference herein and in the appended embodiments to components and aspects in a singular tense does not limit the present disclosure or appended embodiments to only one such component or aspect, but should be interpreted generally to mean one or more, as may be suitable and desirable in each particular instance. Thus, the use of the terms "a", "an", "the" the suffix "(s)" and similar references are to be construed to cover both the singular and the plural, unless otherwise indicated herein or clearly contradicted by context.

All ranges disclosed herein are inclusive of the endpoints, and the endpoints are independently combinable with each other. Unless stated otherwise, any range of values within the endpoints is encompassed. For example, where the endpoints of a range are stated to be from 1 to 10, any range of values, such as from 2 to 6 or from 3 to 5 will be defined by the range.

All references are incorporated herein by reference.

The phrase "ionic liquid" refers to neutral molten salts composed entirely of ions and which are liquid at ambient or near ambient temperatures. The phrase shall include those quaternary organic salts of the formula (I), (II) or (III) as described herein.

The phrase "second demulsifier" shall refer to a demulsifier which is not an ionic liquid.

The phrase "demulsifying composition" shall refer to a composition resulting from contact of an ionic liquid with a second demulsifier. The phrase shall include blends, mixtures, complexes and reactions products of the ionic liquid and second demulsifier.

As used herein, "petroleum hydrocarbon fluid" shall include crude oil, shale oil, shale gas condensate, bitumen, diluted bitumen (dil-bit), refinery fractions including distillates including gas oil cuts, finished fuel including diesel fuel, petroleum fuel and biofuel, finished petroleum products, residual oil, fuel gas, flare gas, propane, butane, liquefied petroleum gas (LPG), natural gas liquid (NGL) and combinations thereof. The ionic liquids and treatment compositions described herein are especially useful in the treatment of crude oil, bitumen, diesel fuel, petroleum fuel, biofuel, residual oil, fuel gas, flare gas, propane, butane, liquefied petroleum gas (LPG), natural gas liquid (NGL) and refinery fractions (including gas oil cuts and light lubricating oils) and combinations thereof. In addition, any of these may contain water, brines, gases such as hydrocarbon gases, or a combination thereof.

As used herein, the word "conduit" may refer to any pipeline, pipe, tubing, tubular, flow conduit, thoroughfare or other artery in which a chemical, including a petroleum hydrocarbon fluid, travels or contacts. The word "vessel" shall include any equipment or container in which a petroleum hydrocarbon fluid is in contact, such as heat exchangers, etc. The conduit may, but not limited to, those composed of a metal, plastic or glass. The site of the "conduit" or "vessel" shall include, but not be restricted to reservoirs, wells, pipelines, refineries, fluid processing or treatment facilities (including those where gas or oil production or treatment occur, chemical plants, thermal power stations, power plants, steel mills, natural gas processing plants, food processing plants, semi-conductor plants and HVAC systems) as well as thoroughfares leading to or from any of the above.

The ionic liquids and demulsifying compositions described herein may be used during the production of crude oil and gas.

In addition, the ionic liquids and demulsifying compositions may be used during the recovery of petroleum hydrocarbon fluids from underground reservoirs.

The ionic liquids and demulsifying compositions are most useful (i) during the production and recovery of oil and gas from a well; (ii) in the treatment of a hydrocarbon stream obtained from a well; (iii) during a refinery operation including light-ends recovery; and (iv) during storage and handling or product movement of hydrocarbon fluids.

The ionic liquids and demulsifying compositions may also be used during the purification or another treatment phase of an industrial product. For instance, the ionic liquids and demulsifying compositions may be used to treat wastewater streams. Such streams include produced water (aqueous fluids produced along with crude oil and natural gas during from reservoirs water naturally present in oil and gas bearing geological formations, aqueous fluids produced or used during the production of oil and gas from reservoirs or an industrial product, aqueous fluids produced during the refining of oil and gas or an industrial product, aqueous fluids used during the refining of oil and gas or an industrial product, aqueous fluids used or produced during transit or storage of petroleum hydrocarbon fluids or an industrial product. Exemplary wastewater streams include flowback water, degassed sour water, boiler blowdown streams, cooling tower bleed-off/blowdown (originating from oil refineries, petrochemical and natural gas processing plants, other chemical plants, thermal power stations, power plants, steel mills, food processing plants, semi-conductor plants and HVAC systems). Wastewater streams from industrial applications include municipal wastewater treatment facilities, streams in transit to or from municipal wastewater treatment facilities, tanning facilities, and the like.

The ionic liquids and demulsifying compositions may also be used within a conduit or vessel or introduced into a conduit or vessel. The ionic liquids and demulsifying compositions may also be used during transit of petroleum hydrocarbon fluids or an industrial product as well as during storage of petroleum hydrocarbon fluid or an industrial product.

The ionic liquid and demulsifying compositions are typically liquid at relatively low temperature. While the ionic liquids are salts, they typically exhibit high flash points, good solvency for other chemicals and strong basicity.

In an embodiment, the ionic liquid demulsifier(s) and/or demulsifying composition(s) disclosed herein may be added to a petroleum hydrocarbon fluid in the form of a solution or dispersion. The ionic liquid demulsifier(s and/or demulsifying composition(s) can be separately added to the petroleum hydrocarbon fluid. Alternatively, an ionic liquid demulsifier and second demulsifer(s) can be combined to form the demulsifying composition which is then contacted with the petroleum hydrocarbon fluid.

The ionic liquid demulsifier(s) and demulsifying composition(s) are typically dissolved in a suitable solvent which may be water, a mono or polyhydric alcohol having 1 to 8 carbon atoms or an aromatic solvent such as methanol, 2-ethylhyexyl alcohol, ethanol, 2-propanol, glycerol, ethylene glycol, diethylene glycol, toluene, xylenes, naphtha, kerosene and combinations thereof. In certain instances, co-solvents may be used to maintain stability. Such co-solvents may include alcohols (such as a $C_3$ to $C_6$), glycol ethers or polar aprotic solvents capable of dissolving both polar and non-polar materials. Typical co-solvents include isopropanol, 2-methyl-hexanol, 2-butoxyethanol and dimethylformamide. If the polymers are formulated to be water soluble, the preferred solvent is water. The amount of the ionic liquid or demulsifying composition in the solvent is such as to about 20 to about 60 percent non-volatile residue (i.e. 80 40% solvent) though ranges may be from 10 vol % to about 99 vol % and in some case about 20 vol % independently to about 50 vol %.

Suitable ionic liquids as demulsifiers are of formula (I):

$$A^+X^-  \quad (I)$$

wherein A is or contains nitrogen, a nitrogen containing heterocyclic ring, is or contains phosphorus, or a phosphorus containing heterocycle; and X is an anion selected from the group consisting of halides; hydroxyl; carbonates; alkyl carbonates; bicarbonates; dithiocarbonates; trithiocarbonates; xanthates, thiocyanates; alkoxides; carboxylates; hydroxycarboxylates; amino fatty acids; anionic alkoxylated fatty acids; anionic metallic complexes, sulfur or silicon containing anions; anionic phosphate esters, anionic thiophosphate esters; anionic phosphonate esters; anionic thiophosphonate esters; alkyl substituted phosphines; anionic urea; anionic thiourea; anionic natural products; anionic thiols; anionic phenols; anionic phenol resins; anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacrylates and acrylamides, optionally copolymerized with one or more ethylenically unsaturated monomers; anionic phosphated maleic copolymers; an anionic homo or copolymer of an oxirane or methyloxirane; and mixtures thereof or a zwitterion.

In an embodiment cation A of formula (I) is or contains nitrogen or a nitrogen-containing heterocyclic ring; and anion X is selected from the group consisting of anionic metallic complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; alkoxides; anionic copolymers of alpha olefins and maleic anhydride, esters, amides, imides or derivatives thereof or a mixture thereof; amino fatty acids; anionic alkoxylated fatty acids; anionic alkyl substituted phosphines; anionic urea; anionic thiourea; anionic acrylamido-methyl propane sulfonate/acrylic acid copolymers; anionic homopolymers, copolymers and terpolymers of one or more acrylates, methacrylates and acrylamides, optionally copolymerized with one or more ethylenically unsaturated monomers; phosphated maleic copolymers and mixture thereof or a zwitterion.

Further, ionic liquids of (II) or (III) may be used as the ionic liquid demulsifier:

$$R^1R^2R^3R^4A^+X^- \quad (II); \text{ or}$$

$$R^1R^2R^3A^+R^8A^+R^5R^6R^7X^- \quad (III)$$

wherein:
wherein:
A in formula (II) is or contains nitrogen or phosphorus or a heterocyclic ring thereof and wherein each A in formula (III) is independently selected from nitrogen or phosphorus or a heterocyclic ring thereof; and X is an anion selected from the group consisting of halides; hydroxyl; carbonates; alkyl carbonates; bicarbonates; carboxylates; hydroxycarboxylates; sulfonates; sulfates; bisulfites; thiocyanates; dithiocarbonates; dithiocarbonates; trithiocarbonates; carbamates; dithiocarbamates; xanthates; sulfides; polysulfides; alkoxides; anionic urea; anionic alkyl substituted phosphines; anionic amino fatty acids; anionic alkoxylated fatty acids; anionic acrylamido-methyl propane sulfonate/acrylic acid copolymers; anionic phosphated maleic copolymers; anionic metal complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof; anionic alkyl substituted phosphines; and anionic homopolymers, copolymers and terpolymers of one or more acrylates, methacrylates acrylamides and acids, optionally copolymerized with one or more ethylenically unsaturated monomers; anionic homo and copolymers of oxirane and/or methyloxirane; anionic; copolymers of olefins and vinyl acetate; and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl (including —$CH_2CH_2OH$) or —$CH_2CH(CH_3)OH$); a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring.

In an embodiment, cation of (I), (II) or (III) is phosphorus or a phosphorus containing ring and X is an anion selected from the group consisting of hydroxyl; bicarbonates; alkoxides; hydroxycarboxylates; silicon containing anions; anionic amino fatty acids; anionic alkoxylated fatty acids; anionic thiophosphonate esters; alkyl substituted phosphines; anionic urea; anionic thiourea; anionic natural products; anionic phenols; anionic phenol resins; anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacylates and acrylamides, optionally copolymerized with one or more ethylenically unsaturated monomers; phosphated maleic copolymers; an anionic homo or copolymer of an oxirane or methyloxirane and mixtures thereof.

In another embodiment, cation A of formula (I), (II) or (III) is nitrogen or a nitrogen heterocyclic ring and anion X is selected from the group consisting of silicon containing anions; anionic thiophosphonate esters; anionic natural products; anionic phenol resins; alkoxides; anionic copolymers of alpha olefins and maleic anhydride, esters, amides, imides or derivatives thereof or a mixture thereof; anionic amino fatty acids; anionic alkoxylated fatty acids; anionic alkyl substituted phosphines; anionic urea; anionic thiourea; anionic acrylamido-methyl propane sulfonate/acrylic acid copolymers; anionic homopolymers, copolymers and terpolymers containing acrylamide units; anionic phosphated maleic copolymers; anionic oxirane or methyloxirane homo or copolymers; and mixtures thereof.

In another embodiment, the ionic liquid represented by (II) or (III) has a cation A of is nitrogen (for II) and each A in (III) is nitrogen as defined herein and wherein X is an anion selected from the group consisting of anionic metallic complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof amino fatty acids; anionic oxirane or methyloxirane homo or copolymer; anionic alkoxylated fatty acids; alkyl substituted phosphines; anionic urea; anionic thiourea; anionic acrylamido-methyl propane sulfonate/acrylic acid copolymers; anionic homopolymers, copolymers and terpolymers containing acrylamide units; phosphated maleic copolymers and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl; a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene; and further wherein R groups may be joined to form a heterocyclic nitrogen, sulfur or phosphorus containing ring.

Preferred cations for the ionic liquids of (III) are those having structures $R^1R^2R^3R^4N^+$; $R^1R^2R^3N^+R^8N^+R^5R^6R^7$; $S^+R^1R^2R^3$; $R^1R^2R^3R^4P^+$; and $R^1R^2R^3N^+R^4P^+R^5R^6R^7$.

In one preferred embodiment, anion X of (I), (II) or (III) is a halide, hydroxide, bicarbonate, carbonate, alkyl carbonate, carboxylate or an alkoxide.

In a preferred embodiment, $R^1$, $R^2$, $R^3$, $R^4$, $R^5$, $R^6$ and $R^7$ of formula (II) and (III) are independently selected from the group consisting of a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, a zwitterion (such as those from oxyalkylation of an amine with an alkylene oxide); or a polyoxyalkylene group; and $R^8$ is a straight or branched $C_{1-30}$ alkylene, an alkylene oxyalkylene, or an alkylene polyoxyalkylene or R groups may be joined to form a heterocyclic nitrogen, sulfur or phosphorus ring; and the anion comprises halides, hydroxide, bicarbonate, carbonate, alkyl carbonates, alkoxides, carboxylates, or a combination thereof; and further wherein $X^-$ is hydroxide, bicarbonate, carbonate, alkyl carbonates, alkoxides, carboxylates, anionic oxirane or methyloxirane homo or copolymers; or a combination thereof. In an exemplary embodiment, A of formula (II) or (III) is nitrogen or a nitrogen containing heterocyclic ring and anion X anion is a hydroxide, bicarbonate, carbonate, alkyl carbonate, alkoxide or an oxirane or methyloxirane homo or copolymer.

In another preferred embodiment, $R^1$, $R^2$, $R^3$, $R^4$, $R^5$, $R^6$ and $R^7$ of (II) and (III) are independently —H or a $C_{1-20}$ alkyl; wherein at least one (or at least two) of $R^1$, $R^2$, $R^3$, $R^4$, $R^5$, $R^6$ and $R^7$ is a $C_{2-20}$ alkyl, preferably a $C_{6-12}$ alkyl.

Exemplary ionic liquids of formulas (I), (II) and (III) include, but are not limited to, those ionic liquids having a cation of dicocodimethyl ammonium and ditallowdimethyl ammonium. Further specific exemplary ionic liquids are dicocodimethyl ammonium hydroxide, benzyltrimethylammonium hydroxide, ditallowdimethyl ammonium hydroxide, tributylmethylammonium methyl carbonate, tetraethylammonium bicarbonate, tetrapropylammonium hydroxide, coco dimethylethylammonium methyl carbonate, dodecyl trimethylammonium hydroxide, (2-hydroxyethyl) cocoalkyl ammonium hydroxide (including dialkyl, trialkyl, tetraalkyl derivatives like dicocodimethyl ammonium hydroxide cocotrimethyl ammonium hydroxide), cocodialkylammonium chloride derivatives (such as (oxydi-2,1-ethanediyl) bis(cocodimethylammonium) chloride), tri-n-butyl methylammonium methyl carbonate, tetrabutylammonium hydroxide, tallowtrimethyl ammonium hydroxide, cocotrialkyl ammonium hydroxide (such as cocotrimethyl ammonium hydroxide), cocodialkylammonium chloride derivatives (such as (oxydi-2,1-ethanediyl) bis(cocodimethylammonium) chloride), hydrogenated tallow trimethyl ammonium hydroxide, dihydrogenated tallow dimethyl ammonium hydroxide, oxydiethylene bis(cocodimethylammonium hydroxide having a structure represented by the formula: $Coco(CH_3)_2N^+(CH_2)_2O(CH_2)_2N^+(CH_3)_2Coco\ (OH^-)_2$ or a combination comprising at least one of the foregoing.

In some instances, the cation of (III) may be a polyamine, meaning the cation may have two or more nitrogen atoms (and in some cases up to 5 nitrogen atoms). In some instances, one or more of the nitrogens of the polyamine may be cationic such that the cation of (III) may be a polyamine containing two or more cationic sites (and in some cases up to 5 cationic sites). In such cases, $R^8$ may correspond to $(-NR^1R^2)_y$ or $(-NR^1R^2R^3)_y$ wherein y corresponds to 1, 2 or 3 to render the number of nitrogen sites and $R^1$, $R^2$, nd $R^3$ are as defined above. Specifically, y is 1 when A is a triamine, y is 2 when A is a tetraamine and y is 3 when A is a pentaamine. Exemplary are cations of diethylenediamine, triethylenetetraamine, tetraethylenepentamine and (bis) hexamethylenetriamine. In other instances, where both of A are phosphorus in (III), the cation may consist of multiple cationic sites on the phosphorus wherein $R^8$ may correspond to $(-PR^1R^2)_y$ or $(-PR^1R^2R^3)_y$ wherein y corresponds to 1, 2 or 3 to render the number of phosphorus sites and $R^1$, $R^2$, nd $R^3$ are as defined above.

Suitable nitrogen containing heterocyclic rings referenced herein include pyridinium imidazolinium and a pyrrole cation (including alkylated derivatives thereof). Further reference to "nitrogen" shall include nitrogen containing cations such as an oxyalkylated nitrogen.

In an embodiment, the cation of (I), (II) or (III) is a quaternary amine salt, triethanolamine methyl chloride, oxyalkylated amine, polyamine, oxyalkylated polyimine, cationic melamine acid colloids or an oxyamine such as those of the formula $(CH_3)_2N(CH_2)_xOH$ where x is 1 to 6, preferably 2.

As used herein, the term "alkyl" refers to a straight or branched chain, saturated monovalent hydrocarbon group regardless whether straight or branched chain is specifically mentioned or not; "aryl" refers to an aromatic monovalent group containing only carbon in the aromatic ring or rings; "arylalkyl" refers to an alkyl group that has been substituted with an aryl group, with benzyl being an exemplary arylalkyl group; "alkylbenzyl" refers to a benzyl group that has been substituted with an alkyl group in the aromatic ring; "hydroxyalkyl" refers to an alkyl group that has been substituted with a hydroxyl group with 2-hydroxyethyl as an exemplary hydroxyalkyl group; "hydroxyalkylbenzyl" refers to a benzyl group that has been substituted with a hydroxyalkyl group as defined herein in the aromatic ring; "alkylene" refers to a straight or branched chain, saturated, divalent hydrocarbon group, and "alkenyl" refers to a straight or branched chain monovalent hydrocarbon group having at least two carbons joined by a carbon-carbon double bond. The term "substituted" as used herein means that at least one hydrogen on the designated atom or group is replaced with another group, provided that the designated atom's normal valence is not exceeded. Substituted with a group means substituted with one or more groups.

As used herein, a polyoxyalkylene group has a formula

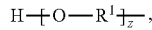

where each occurrence of $R^1$ is independently a $C_{1-10}$ alkylene or $C_{2-8}$ alkylene, specifically ethylene, propylene, butylene, or a combination thereof, and z is an integer greater than 1 such as 2 to 30, 4 to 25, or 8 to 25.

An alkylene polyoxyalkylene group has a formula

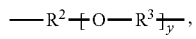

wherein $R^2$ is a $C_{1-30}$ alkylene, each occurrence of $R^3$ is independently a $C_{1-10}$ alkylene or $C_{2-6}$ alkylene, specifically ethylene, propylene, butylene, or a combination thereof, and y is an integer from 1 to 500, such as 2 to 30, 4 to 25, or 8 to 25.

An alkylene oxyalkylene group has a formula of $-R^7-O-R^8-$, wherein $R^7$ and $R^8$ are each independently a $C_{1-20}$, or $C_{1-10}$, or $C_{1-5}$ branched or straight chain alkylene. Optionally, $R^7$ and $R^8$ can be ethylene.

Exemplary halides for the anion $X^-$ are $-Cl$, $-Br$, $-F$ and $-I$. In an embodiment $-Cl$ is preferred.

Suitable sulfur and phosphorus containing anions include sulfates $(SO_4^-)$, bisulfate $(HSO_4^-)$, thiocyanate $(SCN^-)$, thiocarbonate

dithiocarbamates

wherein $R_1$ and $R_2$ are independently selected from $C_{1-20}$ alkyl groups, xanthates

wherein R is a $C_{1-20}$ alkyl, sulfides $(RS^-)$ wherein R is a $C_{1-20}$ alkyl, anionic polysulfides $(RS(S)_xS^-)$ wherein R is a $C_{1-20}$ alkyl and x is one to five, anionic phosphate esters $[ROP(=O)(OH)_2]$ and anionic phosphonate ester $[R-P(=O)(OH)_2$ (wherein R is a $C_{1-20}$ alkyl or a $C_{1-20}$ oxyalkyl- $(RO-)$; anionic thiophosphate esters

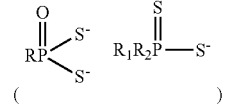

as well as anionic thiophosphonate esters (wherein R is a $C_{1-20}$ alkyl or a $C_{1-20}$ oxyalkyl-$(RO-)$; sulfonates $(RSO_3^-)$ wherein R is $C_{1-20}$ alkyl or aryl or alkylaryl group; and anionic thiols (RSH) where R is $-(CH)_xH$ and x is from 1 to 4.

Exemplary oxirane or methyloxirane homo or copolymers include those containing units of the structure $-(CH_2CH_2O)_xCH_2CH(CH_3)O)_y$ where x and y are independently selected from 1 to 1500.

Exemplary anionic metal complexes in formulae (I), (II) and (III) may include, but not be limited to Fe (such as Fe containing anions like $FeCl_4^-$), aluminum (such as Al containing anions like $AlCl_4^-$), etc. Further, the anionic metal complex may be formed from copper, zinc, boron, tin and mixtures thereof.

The anion may further be an anionic natural product like anions of a polysaccharide, polyphenol or lignin. Suitable anions of polysaccharides include anionic starches (such as mixtures of amylose and amylopectin), anionic polyphenols (such as anionic flavonoids or anionic natural polyphenols and anionic tannins (such as water soluble anionic polyphenols with a molecular weight between 500 and 3,000).

Suitable anions may also be anionic phenolics such as anionic phenols, anionic alkyl substituted phenols, anionic phenol oxyalkylates, anionic alkyl substituted phenol oxyalkylates, anionic phenolic or alkylphenol resins and anionic phenol resin oxyalkylates. Typically, the alkyl groups of the anionic phenolics are $C_{1-28}$.

The anion may also be an alkoxide. Suitable alkoxides include those of the formula RO— where R is a $C_{1-30}$ alkyl or cycloalkyl group. In an embodiment, R is $C_{1-18}$ alkyl, $C_{6-12}$ aryl, or $C_{5-12}$ cycloalkyl. Exemplary alkoxides are tert-butoxide, n-butoxide, isopropoxide, n-propoxide, isobutoxide, ethoxide, methoxide, n-pentoxide, isopentoxide, 2-ethylhexoxide, 2-propylheptoxide, nonoxide, octoxide, decoxide and isomers thereof. Preferably, the alkoxides are tert-butoxide, isopropoxide, ethoxide, or methoxide. Tert-butoxide and methoxide are specifically mentioned. The anion may further be selected from anionic ethylene or propylene oxide homopolymers, anionic copolymers or terpolymers (which may optionally be crosslinked). Suitable crosslinking agents include bisphenol A or maleic anhydride.

Suitable alkyl carbonates are those of the formula $ROCO_2^-$, where R is a halogenated or non-halogenated linear or branched alkyl, or hydroxyl alkyl group, preferably a halogenated or non-halogenated linear or branched $C_{1-8}$ or $C_{1-5}$ alkyl group.

Exemplary carboxylates include formate, acetate, propionate, benzoate, n-butyrate, isobutyrate, and pivalate. Exemplary hydroxycarboxylates include octanoate, la rate, glycolate, lactate, citrate, gluconate and gluconate as well as $C_{18}$ fatty acids such as oleate, linolate and stearate.

Suitable anionic copolymers of alpha olefins and maleic anhydride, esters, amides, imides (and derivatives thereof) include those of the general structure

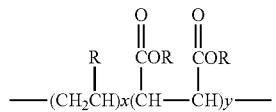

where R is a $C_{1-30}$ alkyl group.

Suitable alkyl carbonates, carboxylates, anionic metal complexes, anionic natural products, anionic phenolics, alkoxides, anionic alpha olefin/maleic anhydride polymers, anionic polymers of acrylates, methacrylates and acrylamides and sulfur cations are those referenced in the paragraphs above.

The ionic liquids of (I), (II), and (III) are salts having a melting point range of −100° C. to 200° C., typically below 100° C. They are generally non-volatile and exhibit low vapor pressures and are environmentally more benign than other organic solvents, such as volatile aromatics and alkanes. They are thermally stable over a wide temperature range with some having a liquid range of up to 300° C. or higher. Typically they are molten salts of organic compounds or eutectic mixtures of organic and inorganic salts. Stability and other fundamental physical properties of the ionic liquids are influenced by the selection of cation while the selection of anion generally determines the functionality of the ionic liquid.

In an exemplary embodiment, ionic liquids disclosed herein may be prepared by first forming a quaternary salt followed by ion exchange with an acid or salt or by an anionic metathesis reaction with an appropriate anion source to introduce the desired counter anion. As an example, a phosphorus or nitrogen cation (such as an oxyalkylated amine) or a phosphorus or nitrogen containing heterocyclic compound (such as an imidazole or pyridine) may first react with an alkylating agent to form the quaternary salt. The alkylating agent may be an alkyl chloride providing a broad range of alkyl groups on the nitrogen including straight and branched or cyclic $C_1$-$C_{20}$ alkyl groups. The quaternary salt may then be subjected to ion exchange with an acid or salt to form the ionic liquid.

A demulsifying composition may be formed by contacting any of the ionic liquids of formula (I), (II) or (III) with a second demulsifier. The demulsifying composition may consist of the second demulsifier and an ionic liquid wherein anion X of the ionic liquid and the counter-anion of the second demulsifier are the same. For instance, a suitable ionic liquid may be prepared of formula (II) or (III) where the cation is nitrogen, each of $R_1$, $R_2$, $R_3$ and $R_4$ are hydrogen and anion A is an anionic oxyalkylated amine. The conjugate base of the second demulsifier is the oxyalkylated amine, the same as the anion of the ionic liquid.

Demulsifying compositions formed by contacting the ionic liquid(s) and second demulsifier(s) have been noted to provide synergy, e.g., demulsification significantly improves when a second demulsifier (other than the ionic liquid) is in contact with the ionic liquid demulsifier. In such instances, the ionic liquid demulsifier may be viewed as a promoter for the second demulsifier.

In one non-limiting example, the presence of the ionic liquid in the demulsifying composition increases the effectiveness of the second demulsifier as well as the ionic liquid demulsifier by at least 25% and sometimes 50% or higher compared to when the second demulsifier or ionic liquid(s) is used by itself.

In some instances, contact of the ionic liquid demulsifier(s) with the second demulsifier(s) forms a reaction product. The synergy of the reaction product is noted in comparison to either reactant—ionic liquid demulsifier(s) and second demulsifier(s)—by itself.

In some instances, the demulsifying composition formed by contacting the ionic liquid demulsifier(s) with the second demulsifier(s) constitutes a blend, the blend exhibiting the stated synergy. In other instances, the synergy demonstrated by the ionic liquid demulsifier(s) and second demulsifier(s) is noted by the formation of a complex when the ionic liquid demulsifier is contacted with the second demulsifier.

In some instances, the amount of ionic liquid demulsifier in the demulsifying composition may be from about 3 to about 99 weight percent. In other instances, the amount of second demulsifier in the composition may be from about 3 to about 99 weight percent.

The second demulsifier is preferably a liquid material. If the inhibitor is a solid, it may be dissolved in a suitable solvent, thus making it a liquid.

The ionic liquid demulsifier(s) and demulsifying composition(s) are effective for resolving a broad range of hydrocarbon emulsions encountered in crude oil production, refining and chemical processing. Specific examples include, but are not limited to, oilfield production emulsions, refinery desalting emulsions, refined fuel emulsions, and recovered oil emulsions (including used lubricant oils as well as recovered oils in the steel and aluminum industries). As an example, the ionic liquid demulsifier(s) and demulsifying composition(s) may be useful for resolving emulsions in butadiene, styrene, acrylic acid, and other hydrocarbon monomer process streams.

In a preferred embodiment, the ionic liquid(s) and/or demulsifying composition(s) may be contacted with a hydrocarbon-containing stream under severe conditions of heat, pressure, agitation and/or turbulence. In some instances, temperatures may range from about −50° C. to about 250° C., for example about −5° C. to about 200° C. or about 20° C. to about 150° C., and a pressure of about 14.7 pounds per square inch absolute (psia) to about 40,000 psia or about 14.7 psia to about 20,000 psia.

The ionic liquid(s) or demulsifying composition(s) may be contacted with a surface of a conduit or vessel at any point of contact in the conduit or vessel where the hydrocarbon stream is in contact or has been in contact.

The ionic liquid(s) and demulsifying composition(s) defined herein are further effective demulsifying agents during the storage and transportation of petroleum hydrocarbon fluids.

In an aspect, the ionic liquid demulsifier(s) and demulsifying composition(s) are used to demulsify water-in-oil emulsions in crude oil production and refinery processes. In the process of resolving crude petroleum oil emulsions of the water-in-oil type, the ionic liquid demulsifier(s) or demulsifying composition(s) may be brought into contact with or caused to act upon the emulsion to be treated to resolve or break the crude oil emulsion. The use of the ionic liquid demulsifier(s) and/or demulsifying composition(s) thus enhances productivity of the reservoir and well to produce hydrocarbons. Further, they prevent increased production costs and improve the quantity and quality of recovered petroleum hydrocarbon fluids.

With respect to resolving emulsions encountered in crude oil production, the ionic liquid demulsifier(s) or demulsifying composition(s) may be introduced into the crude oil emulsion by injecting beneath the surface into the oil well itself, by injecting into the crude oil at the well-head or by injecting into the crude oil process stream at a point between the well-head and the final oil storage tank. The ionic liquid demulsifier(s) or demulsifying composition(s) may be injected continuously or in batch fashion. The injection is preferably accomplished using electric or gas pumps. The treated crude oil emulsion is then allowed to stand in a quiescent state until the desired separation into distinct layers of water and oil results. Once separation into distinct layers of water and oil has been effected, free water and crude oil can be separated.

In another embodiment crude oil may be demulsified in the reservoir provided to hold the ionic liquid demulsifier(s) or demulsifying composition(s) in either diluted or undiluted form adjacent to the point where the effluent crude petroleum oil exits the well. The reservoir may be is connected to a proportioning pump capable of injecting the ionic liquid demulsifier(s) or demulsifying composition(s) into the fluids exiting the well, The fluids then pass through a flow line into a settling tank.

The ionic liquid demulsifer(s) or demulsifying composition(s) also have particular applicability in the refining of petroleum hydrocarbon fluids as well as in other applications where the presence of an emulsion presents severe operation problems and quality of produced fluids. In a refinery desalting process, the incoming crude is deliberately mixed with wash water to remove dissolved salts and other contaminants. To extract water from the resulting water-in-crude oil emulsion, the emulsion is admixed with an effective amount of the ionic liquid demulsifier(s) or demulsifying composition(s).

In another preferred aspect, the water-in-oil emulsion is a refinery desalting emulsion. The desalting process may involve the use of pumps to move the incoming crude oil from storage tanks via piping through one or more heat exchangers. Wash water may then be injected into the heated oil stream and the stream is intimately mixed by an in-line mixing device. The emulsified stream flows into an electrostatic desalter vessel where resolution and separation of the crude oil and water effluent occurs. The ionic liquid demulsifier(s) and demulsifying composition(s) may further be injected into the fluid stream at various places along the path of the desalting process. Potential injection locations include prior to the crude oil storage tanks, on the outlet side of the crude oil storage tanks, upstream of the in-line mixer and into the wash water stream.

A fluid containing an ionic liquid demulsifer(s) or demulsifying composition(s) may also contain one or more well treatment additives conventionally used in the production, recovery or treatment of a hydrocarbon fluid produced or originating from a gas or oil well such as corrosion inhibitors, viscosity reducers, etc.

In an embodiment, the ionic liquid demulsifier(s) or demulsifying composition(s) may be used in a process or removing metals and/or amines and/or phosphorus from a petroleum hydrocarbon or industrial stream. Extraction of metals, metal salts, phosphorus and amines from fluids is typically performed in a desalter. Solubilized metals (such as inorganic salts like sodium and potassium) and water insoluble metal organic acid salts (such as calcium naphthenate and iron naphthenate) are typically dispersed as particulates in the oil in an emulsion and removed as wastewater. The water-in-oil emulsion in the wastewater may then be demulsified using the ionic liquid demulsifier(s) or demulsifying composition(s).

Generally, the amount of ionic liquid(s) and demulsifying composition(s) added to a fluid is about 1 ppm to about 5,000 ppm, or about 1 ppm to about 500 ppm, or about 5 ppm to about 150 ppm. Typically, the amount of ionic liquid(s) and demulsifying composition(s) added during oilfield production is from about 50 to about 500 ppm; from about 1 to about 100 ppm during desalting; from about 1 to about 30 ppm in treatment of refined fuels; and from about 30 to about 3000 ppm in treatment of recovered oils.

The ionic liquids of formula (I), (II) and (III) may be used to separate or break or resolve an oil in a water-in-oil emulsion as well as oil from water in an oil-in-water emulsion.

In an embodiment, such ionic liquids are effective in breaking emulsions in completion fluids as well as drilling fluids.

The ionic liquid demulsifier(s) and demulsifying composition(s) are particularly effective in disrupting stable emulsions in petroleum crude as well as bitumen formed during recovery of petroleum crude from the reservoir or by the addition of water to a hydrocarbon fluid during secondary oil recovery. Such emulsions may form at a refinery following addition of water into the crude to extract salts and fine solids. These emulsions are known to poison catalysts (from dissolved salts in the emulsion), foul machinery, and accumulate entrained solids in unit operations.

Demulsifying compositions containing the ionic liquid demulsifier and second emulsifier have been noted to provide a synergistic effect, i.e., the effectiveness of the demulsifying composition containing the ionic liquid demulsifier and second demulsifier in breaking the emulsion is higher compared to the ionic liquid demulsifier or second demulsifier by themselves. Further, the time required for demulsifying an emulsion has been seen to decrease by use of the demulsifying composition compared to when demulsification proceeds only in the presence of the ionic liquid demulsifier or second demulsifier.

In an embodiment, the anion of ionic liquid demulsifier (I), (II) and (III) may be selected from anionic condensation polymers of alkylene oxides and glycols, anionic ethylene oxide/propylene oxide copolymers, arylsulfonates, anionic polyamidoamines, anionic ureas, anionic thioureas, anionic polyether polyols, anionic polyethers, anionic polyol esters, anionic polyesters, anionic polyglycol esters, anionic polyurethanes, anionic oxyalkylated polymers condensation polymers of di-propylene glycol as well as trimethylol propane; condensates of o-toluidine and formaldehyde; anionic phenolic polymers and anionic alkyl substituted phenol formaldehyde resins and anionic oxyalkylated phenol formaldehyde resins), anionic alkoxylated epoxy resins, anionic diepoxides (including bis-phenyl diepoxides, polyglycol diepoxides, and di-epoxidized oxyalkylated polyethers), alkylaryl sulfonates, alkylaryl sulfonates, alkylarylsulfonate, anionic polyacrylamides, anionic aminomethylated polyacrylamides, anionic oxyalkylated ether sulfate salts, anionic sulfonated glycerides, anionic acetylated castor oils, anionic polyalkylene glycols, and anionic (methyl) oxirane polymers.

Suitable second demulsifiers to be used in combination with the ionic liquid demulsifier of formula (I), (II) and (III) may be anionic, cationic, amphoteric as well as non-ionic. In some instances, the second demulsifier may be crosslinked or be an acid based demulsifier. Exemplary second demulsifers include, but are not limited to, condensation polymers of alkylene oxides and glycols, such as ethylene oxide and propylene oxide, polyether polyols, polyethers, polyol esters, polyesters, polyglycol esters, polyurethanes, polyamides, polyamidoamines, polyimines, condensates of o-toluidine and formaldehyde, oxyalkylated polymers condensation polymers of di-propylene glycol as well as trimethylol propane; oxyalkylated imine polymers, phenolic polymers and alkyl substituted phenol formaldehyde resins and oxyalkylated phenol formaldehyde resins, diepoxides (including bis-phenyl diepoxides, polyglycol diepoxides, and di-epoxidized oxyalkylated polyethers), triethanolamine methyl chloride quaternary and polymers thereof, melamine acid colloids, aminomethylated polyacrylamide, ammonium alkylaryl sulfonates, alkylaryl sulfonates, alkylarylsulfonate, amine salts, oxyalkylated amines and polyamines, oxyalkylated ether sulfate salts, oxirane and (methyl) oxirane polymers, polyalkylene glycols, sulfonated glycerides, sulfonated oils, acetylated castor oils.

In a preferred embodiment, the anion of the ionic liquid of (I), (II) or (III) may be the same as the counter anion of the second demulsifier.

Suitable anionic phenol resins for use as the anion of the ionic liquid demulsifier include anionic phenol aldehyde resins as well as a blend of anionic phenol aldehyde resins with amine or polyamine additives. The anionic phenol aldehyde resin may include polymers or oligomers derived from substituted-monophenols or unsubstituted-monophenols and an aldehyde. The monophenol substituents can be attached to the para, ortho, or both positions of the monophenol. Preferably the substituents are attached to the para position of the monophenol. The substituted monophenol can be an alkyl substituted monophenol. The alkyl substituents include $C_{1-20}$, $C_{4-18}$, or $C_{4-12}$ branched or linear alkyl groups. The anionic phenol aldehyde resin can be derived from a single substituted-monophenol or from combinations of two or more different substituted-monophenols or unsubstituted monophenol and an aldehyde. The molar ratio of the two or more different substituted-monophenols or unsubstituted monophenol are not particularly limited.

Exemplary anionic phenols having branched alkyl groups include anionic branched dodecyl phenol, branched nonyl phenol, tert-butylphenol, t-amyl phenol, and branched hexyl phenols such as 4-(1-methylpentyl) phenol, 4-(1,2-dimethylbutyl)phenol, and 4-(1-ethylbutyl) phenol, and 4-(1-ethyl-2-methylpropyl) phenol.

Exemplary aldehydes include formaldehyde, paraformaldehyde, acetaldehyde, propionaldehyde, butyraldehyde, glyoxal, glutaraldehyde, 1,9-nonanedial, or a combination comprising at least one of the foregoing. Formaldehyde is specifically mentioned.

In an embodiment, the anionic phenol aldehyde resin may be derived from formaldehyde and a single substituted monophenol are of the structure:

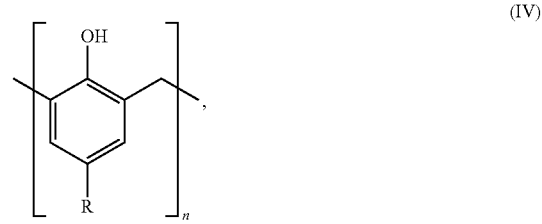

wherein R is —H, $C_{1-20}$, $C_{4-18}$, or $C_{4-12}$ branched or linear alkyl groups, and n is an integer of greater than 1, typically greater than 2.

When the anionic phenol aldehyde resins are derived from two alkyl-substituted monophenols (or phenol with one alkyl-substituted monophenol) and formaldehyde, the phenol aldehyde resins can have the formula

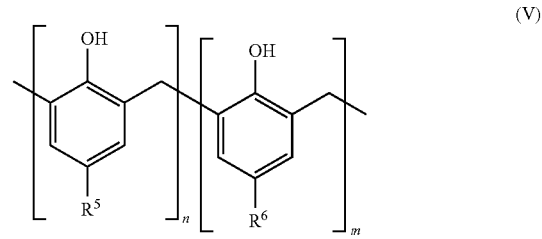

wherein $R^5$ is a $C_{1-20}$ linear or branched alkyl, $R^6$ is different from $R^5$ and is H or a linear or branched $C_{1-20}$ alkyl, n and m are integers greater than 1. In an embodiment, $R^5$ is a $C_{7-16}$ linear or branched alkyl and $R^6$ is a $C_{1-20}$, typically a $C_{1-6}$, linear or branched alkyl.

The value of n:m can vary broadly, for example about 99:1 to about 1:99, about 1:20 to about 20:1, or about 1:10 to about 10:1. Optionally in some embodiments, the value of n:m can be about 1:5 to about 5:1. Optionally in other embodiments, the value of n:m can be about 1:2 to about 2:1.

In an embodiment, the anion of the ionic liquid demulsifier is an anionic phenolic aldehyde condensate and the counter anion of the second demulsifier is a phenol aldehyde condensate.

Other exemplary anions of the ionic liquid demulsifier include anions of an ethylene oxide/propylene oxide copolymer having structure (VI):

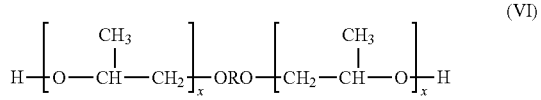
(VI)

wherein x is independently from 1 to 1500.

Other preferred anions of the ionic liquid demulsifiers include anions of arylsulfonates of formula (VII):

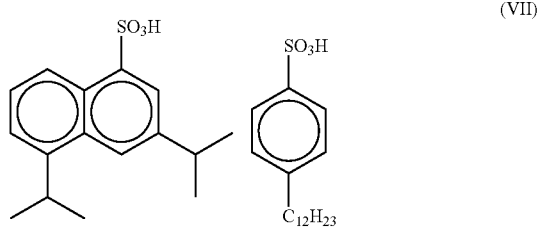
(VII)

In addition, preferred anions of the ionic liquid demulsifiers are anions of thioureas, such as those of (VIII):

(VIII)

wherein each R is independently selected from a $C_1$ to $C_{20}$ alkyl group.

The anion of the ionic liquid may further be a dithiocarbamate, such as those of the structure (IX)

(IX)

or the sodium salt wherein $R_2$ is a $C_1$ to $C_{20}$ alkylxanthates (such as those having structure (X):

(X)

or the sodium salt wherein R is a $C_1$ to $C_{20}$ alkyl.

In an embodiment, the cation of the ionic liquid may be a cationic oxyalkylated amine, such as those having structure (XI):

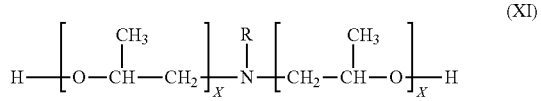
(XI)

wherein R is —H or a $C_1$-$C_{18}$ alkyl group and each x is independently 1 to 1500. Suitable oxyalkylated amines also include those of similar structure as above except where ethylene oxide alone or in combination with propylene oxide is use as the oxyalkyl group.

The cation may further be a polyacrylamide of the structure (X)

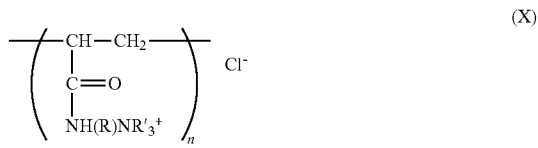
(X)

wherein R is a $C_{18}$ to $C_{30}$ alkyl group and R' is —H or $C_{18}$ to $C_{28}$ alkyl group and n is up to 30,000 or higher.

In another embodiment, the cation of the ionic liquid demulsifier are those derived from a polyamine, such as diethylenediamine, polyethyleneamines [like $H_2N(CH_2CH_2NH)_nCH_2CH_2NH_2$ where n is from 1 to 50] as well as polyether etheramines of the general structure $H_2N(CHRCH_2O)_nCH_2CHRNH_2$ wherein n is from 1 to 50.

In a preferred embodiment, anion X of the ionic liquids of (I), (II) and (III) is the same as the counter anion form of the second demulsifier. In a preferred embodiment, the second demulsifier are those included in (IV)-(X) above.

The ionic liquids and/or demulsifying compositions described herein may exhibit multiple functions. In an embodiment, the ionic liquid or demulsifying composition, in addition to acting as a demulsifer can also function as a water clarifier. For example, the ionic liquid demulsifier(s) and/or demulsifying composition(s) may be used in a closed mud system when clear effluent is needed.

In an embodiment, ionic liquid demulsifier(s) which function as water clarifiers include, but are not limited to, those wherein the anion is selected from anionic polycondensates based on N,N'-bis[3-(dimethylamino)propyl]urea and those of based on N,N'-bis[3-(dimethylamino)propyl]urea, anionic polymers (including homopolymers, copolymers and terpolymers) containing acrylic acid, anionic polyacrylate copolymers, anionic polyacrylamides as well as copolymers; anionic poly(acrylate/acrylamide) copolymers, anionic polycondensates based on alkanolamine, anionic dithiocarbamates; in particular anionic polycondensates based on triethanolamines, and combinations thereof.

EXAMPLES

All percentages set forth in the Examples are given in terms of weight units except as may otherwise be indicated.

Example 1. Preparation of a Phenol Resin Derivative

To a 250 ml round bottom flask fitted with a magnetic stirrer, condenser, addition funnel and a Dean-Stark trap was added 44 grams of xylene, 40 grams (0.18 mole) of p-nonyl phenol and 0.8 grams (0.002 moles) of p-dodecylbenezene sulfonic acid catalyst. The mixture was stirred and heated to 80° C. and then 14.8 grams (0.18 mole) of 37% aqueous formaldehyde was added dropwise. After complete addition of formaldehyde, the mixture was stirred for 1 hour and the temperature was then increased to distill off all water from the reaction mixture. The water distillate was collected in the Dean Stark trap and any xylene collected was returned to the reaction vessel. Heating was continued until the theoretical amount of water was collected in the trap. The sample was then cooled to room temperature.

Example 2. Preparation of Ionic Liquids by Anion Exchange

To a 20 gram sample of the resin solution prepared above in Example 1 was added dropwise 2 grams of 50% methanolic potassium hydroxide. The mixture was stirred while heating at 60° C. for 30 minutes. About 2.9 grams of bis-(2hydroxyethyl), methyl cocoammonium chloride was then added dropwise with stirring. Heating was continued at 60° C. for another hour and then the solution was filtered while still hot to remove the potassium chloride precipitate that formed in the mixture. This procedure rendered a product with a 1:0.25 resin to quat molar ratio. To make other ratios, the amount of the potassium hydroxide solution and the quaternary ammonium chloride were scaled up accordingly while keeping the amount of resin and the reaction conditions constant.

Example 3. Preparation of Ionic Liquid Using Neutralization Procedure with Quaternary Ammonium Hydroxides A 20 gram sample of the resin prepared above was stirred at room temperature while 4.1 grams of 55% aqueous tetrabutylammonium hydroxide was added dropwise. The mixture was stirred for 1 hour after addition of the base and the product was then used. This procedure gave a product with a 1:0.25 resin/quat molar ratio. To make other resin/quat ratios, the amount of the quaternary ammonium hydroxide was scaled up accordingly while keeping the amount of resin and the reaction conditions constant. Some of the quaternary ammonium hydroxides were diluted aqueous solutions and formed a separate aqueous layer when cooled after the 1 hour stir period. In these cases, the upper, organic phase containing the ionic liquid product was decanted away from the aqueous phase. The reaction may be summarized as follows:

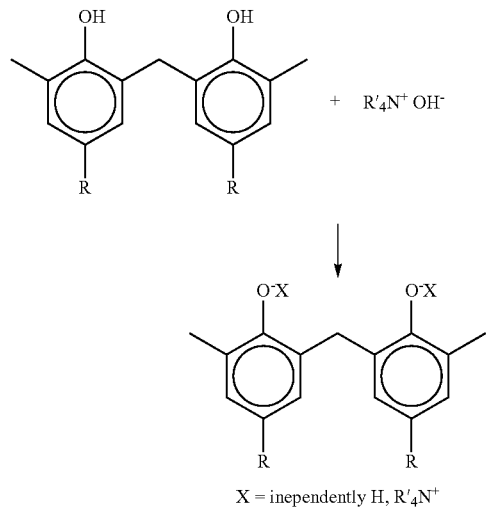

X = inependently H, R'$_4$N$^+$
R = (C$_1$ to C$_{20}$ alkyl)
R' = C$_1$ to C$_{20}$ alkyl, alkylaryl, ethoxyalkyl (CH$_2$CH$_2$O—R), propxyalkyl CH(CH$_3$)CH$_2$O—R

Example 4. Preparation of Ionic Liquid Using a Polyglycol o 10 grams of xylene was added 7 grams of polypropyleneglycol-di potassium salt. The mixture was stirred while heating to 60° C. Then 1 gram of a diammonium quat halide (oxydi-2,1-ethanediyl) bis(cocodimethylammonium) dichloride) was added in small portions over a 30 minute period. A white color solid formed immediately on addition of the ammonium halide. Heating and stirring of the mixture was continued for 1 hour after which the precipitate was filtered away from the product while it was still hot. The reaction may be summarized as follows:

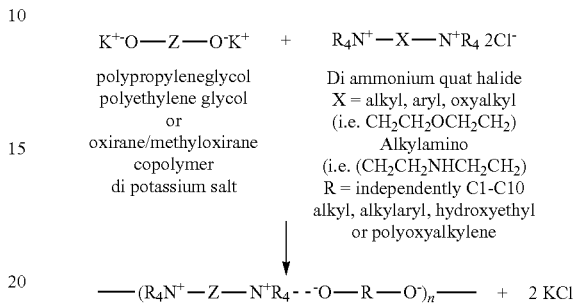

Example 5: Preparation of an Ionic Liquid Using Mixed Polyglycol

Mixed polyglycol products were prepared following the procedure of Example 4 except a di metal (potassium) salt of a polyglycol made from an ethylene oxide/propylene oxide copolymer was substituted for the polypropylene glycol salt.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended embodiments, and may be made and used by one of ordinary skill in the art without departing from the spirit or teachings of the disclosure and scope of appended embodiments. Thus, all matter herein set forth should be interpreted as illustrative, and the scope of the disclosure and the appended embodiments should not be limited to the embodiments described and shown herein.

What is claimed is:

1. A method of demulsifying an emulsion comprising contacting the emulsion with an ionic liquid of the formula:

$$R^1R^2R^3N^+R^8N^+R^5R^6R^7X^-  \quad (I)$$

wherein:
R$^1$, R$^2$, R$^3$, R$^5$, R$^6$ and R$^7$ are independently selected from the group consisting of hydrogen; benzyl; alkylbenzyl, or oxyalkyl; a straight or branched alkyl group, an alkylbenzyl group, an arylalkyl group, a straight or branched chain alkenyl group, a hydroxyalkyl group or a hydroxyalkylbenzyl group; and a polyoxyalkylene group; and R$^8$ is a straight or branched alkylene group, an alkylene oxyalkylene, or an alkylene polyoxyalkylene or a zwitterion; and further wherein R groups may be joined to form a heterocyclic nitrogen containing ring; and X is an anionic ethylene oxide/propylene oxide copolymer.

2. The method of claim 1, wherein R$^1$, R$^2$, R$^3$, R$^5$, R$^6$ and R$^7$ are independently selected from the group consisting of hydrogen; benzyl; oxyalkyl; a straight or branched $C_{1-30}$ alkyl group; a $C_{7-30}$ alkylbenzyl group; a $C_{7-30}$ arylalkyl group; a straight or branched $C_{3-30}$ alkenyl group; a $C_{1-30}$ hydroxyalkyl group; a $C_{7-30}$ hydroxyalkylbenzyl group; and a polyoxyalkylene group and further wherein R groups may be joined to form a heterocyclic nitrogen containing ring; and $R^8$ is a straight or branched $C_{1-30}$ alkylene, an alkylene oxyalkylene, or an alkylene polyoxyalkylene.

3. The method of claim 1, wherein $R^1, R^2, R^3, R^5, R^6$ and $R^7$ are independently selected from —H, a $C_{1-20}$ alkyl, —$CH_2CH_2OH$, —$CH_2CH(CH_3)OH$, and an oxirane or methyloxirane homo or copolymer containing $(CH_2CH_2O)_x$ $CH_2CH(CH_3)O)_y$ where x and y are independently selected from 1 to 1500 and mixtures thereof.

4. The method of claim 1, wherein X is the anion of a polymer of the structure:

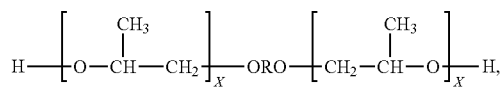

wherein x is independently selected from integer of 1 to 1500 and R is a $C_1$-$C_{10}$ alkylene group.

5. The method of claim 1, wherein the ionic liquid is a component of a demulsifying composition which further contains a second demulsifier which is not an ionic liquid.

6. The method of claim 5, wherein the second demulsifier is an ethylene oxide/propylene oxide copolymer.

7. The method of claim 5, wherein the ionic liquid enhances the performance of the second demulsifier.

8. The method of claim 5, wherein the ionic liquid and second demulsifier form a reaction product.

9. The method of claim 5, wherein the ionic liquid and second demulsifier are a synergistic blend.

10. The method of claim 5, wherein the amount of ionic liquid demulsifier in the demulsifying composition is from about 3 to about 99 weight percent.

11. The method of claim 5, wherein the amount of second demulsifier in the demulsifying composition is from about 3 to about 99 weight percent.

12. The method of claim 5, wherein the demulsifying composition is contacted with the emulsion in a conduit or vessel wherein a hydrocarbon stream is in contact with the conduit or vessel.

13. The method of claim 5, wherein the demulsifying composition is contacted with the emulsion during storage and/or transportation of a petroleum hydrocarbon fluid.

14. The method of claim 5, wherein the emulsion is demulsified with the demulsifying composition during production or refining of crude oil or during removal of metals, amines and/or phosphorus from a petroleum hydrocarbon or an industrial stream.

15. The method of claim 1, wherein the emulsion is a water-in-oil emulsion.

16. The method of claim 15, wherein the water-in-oil emulsion is a crude oil emulsion.

17. The method of claim 16, wherein the crude oil emulsion is a refinery desalting emulsion or a crude oil production emulsion.

18. The method of claim 1, wherein the melting point of the ionic liquid is −100° C. to 200° C.

19. The method of claim 1, wherein the ionic liquid is contacted with the emulsion in a conduit or vessel wherein a hydrocarbon stream is in contact with the conduit or vessel.

20. The method of claim 1, wherein the ionic liquid is contacted with the emulsion during storage and/or transportation of a petroleum hydrocarbon fluid.

21. The method of claim 1, wherein the ionic liquid is contacted with a hydrocarbon-containing stream at a temperature from about −50° C. to about 250° C. and/or a pressure of about 14.7 psia to about 40,000 psia.

22. The method of claim 1, wherein the emulsion is demulsified with the ionic liquid during production or refining of crude oil.

23. The method of claim 1, wherein the emulsion is demulsified with the ionic liquid during removal of metals, amines and/or phosphorus from a petroleum hydrocarbon or an industrial stream.

24. The method of claim 1, wherein the emulsion is a water-in-oil emulsion and further wherein the ionic liquid separates, breaks or resolves oil from the water-in-oil emulsion.

25. The method of claim 1, wherein the emulsion is an oil-in-water emulsion and further wherein the ionic liquid separates, breaks or removes oil from the oil-in-water emulsion.

* * * * *